Feb. 7, 1961 J. A. RICE 2,970,456
AUTOMOBILE COOLING UNIT
Filed July 2, 1958 2 Sheets-Sheet 1
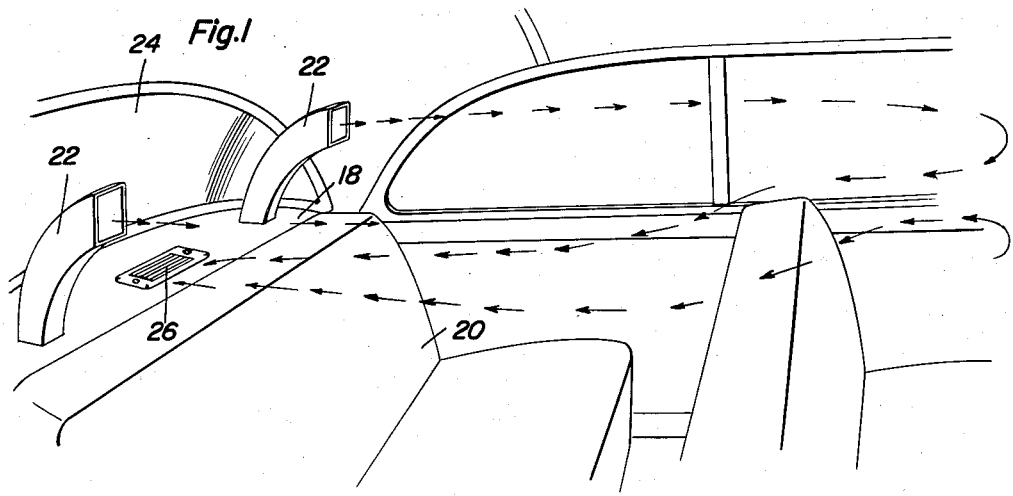
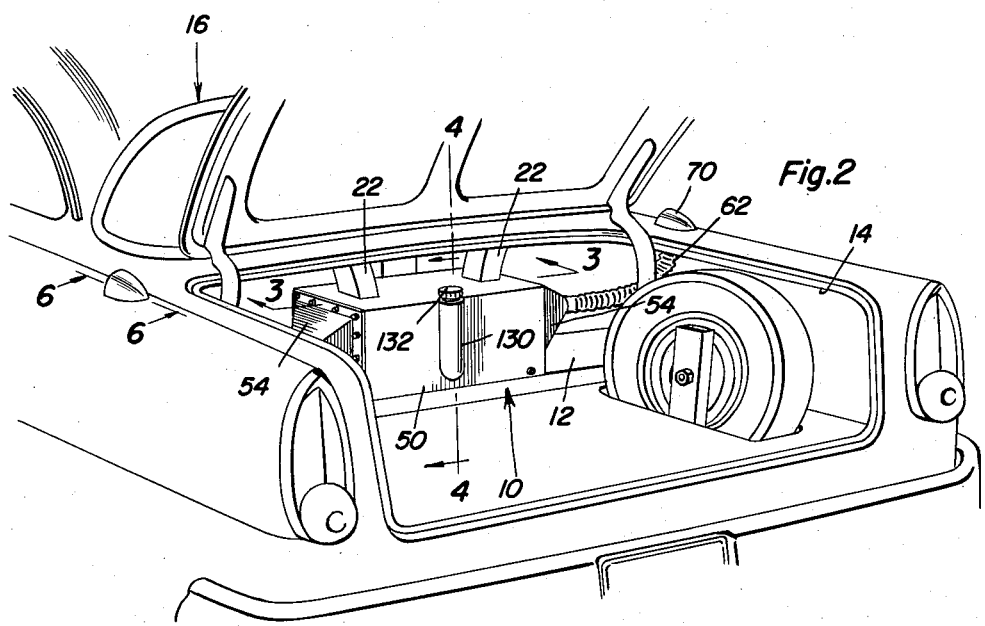
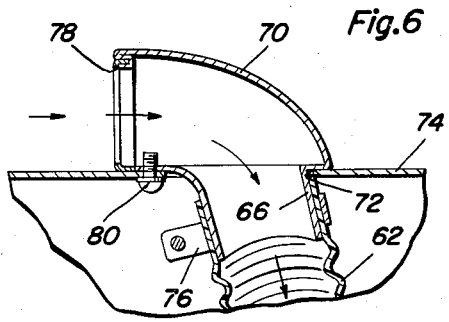
Jessie A. Rice
INVENTOR.

Feb. 7, 1961          J. A. RICE          2,970,456

AUTOMOBILE COOLING UNIT

Filed July 2, 1958          2 Sheets-Sheet 2

Jessie A. Rice
INVENTOR.

BY *Clarence A. O'Brien*
*and Harvey B. Jackson*
Attorneys

United States Patent Office 2,970,456
Patented Feb. 7, 1961

2,970,456

AUTOMOBILE COOLING UNIT

Jessie A. Rice, 2102 S. Monticello, Big Spring, Tex., assignor of twenty-five percent to Charles R. Blake, Big Spring, Tex.

Filed July 2, 1958, Ser. No. 746,199

1 Claim. (Cl. 62—244)

The present invention generally relates to a cooling unit for automotive vehicles and more particularly to an evaporative cooling unit for sedan type passenger carrying vehicles mounted in an out-of-the-way position in the trunk normally provided in such a vehicle although the device may be used in other orientations.

The primary object of the present invention is to provide an evaporative cooling unit for automobiles in which the cooling unit receives a constant supply of fresh dry air from outside the vehicle and is constantly exhausting air from the vehicle to the outside air with the cooling unit having two separate evaporative units with a blower for each unit and with the blowers and evaporative units being isolated from each other thereby providing a highly effective evaporative unit without any interference from the separate units since the air passing through the separate units and the separate blowers is isolated.

Another object of the present invention is to provide an automobile cooling unit which is easily installed in the trunk of a vehicle and provided with air inlet conduits extending to the exterior surface thereof and cool air discharge ducts communicating with the interior of the vehicle and an air discharge duct communicating with the interior of the vehicle and extending downwardly through the bottom thereof and terminating with a lower end which will suck air from the vehicle during forward motion thereof and also provided with an exhaust fan for exhausting air from the vehicle when the vehicle is not moving forwardly or at a very low rate of speed.

Another feature of the present invention resides in its simplicity of construction, efficiency of operation, adaptation for mounting in various types of vehicles and effectively cooling the interior thereof and its relatively inexpensive manufacturing cost.

These together with other objects and advantages which will become subsequently apparent reside in the details of construction and operation as more fully hereinafter described and claimed, reference being had to the accompanying drawing forming a part hereof wherein like numerals refer to like parts throughout, and in which:

Figure 1 is a partial interior perspective view of the rear of a passenger automobile illustrating the cool air inlet ducts and the outlet adapter;

Figure 2 is a rear perspective view of a trunk of a vehicle illustrating the air cooling unit of the present invention installed therein;

Figure 6 is a detailed sectional view taken substantially upon a plane passing along section line 6—6 of Figure 2 illustrating the air inlet duct and adapter on either side of the vehicle.

Figure 3:
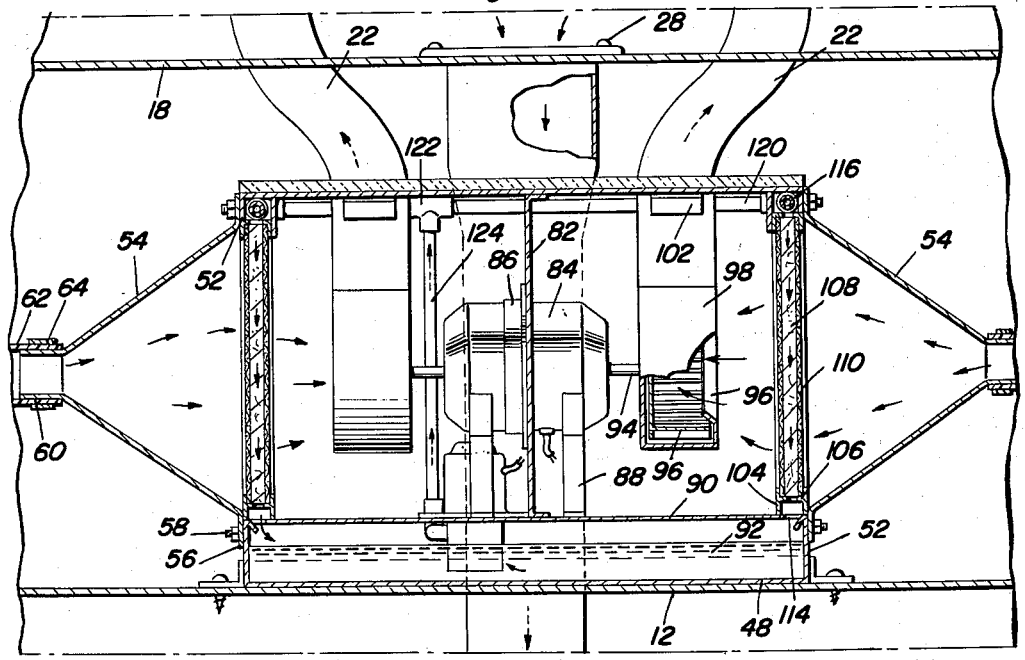
Figure 3 is a longitudinal, vertical sectional view taken substantially upon a plane passing along section line 3—3 of Figure 2 illustrating the internal construction of the cooling unit.
Figures 4, 5:
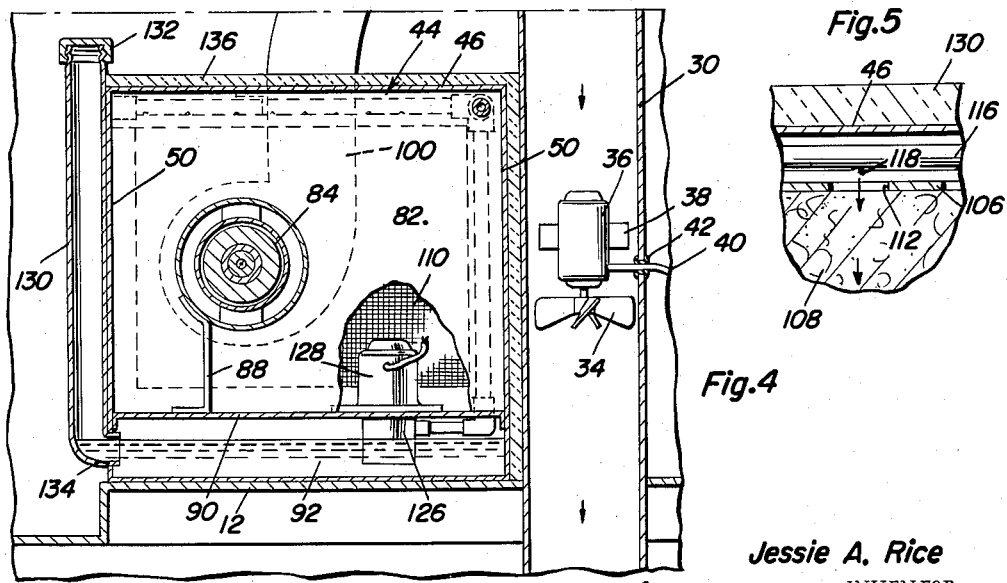
Figure 4 is a vertical sectional view taken substantially upon a plane passing along section line 4—4 of Figure 2 illustrating further structural details of the cooling unit and the discharge duct.
Figure 5 is a detailed sectional view illustrating the manner of discharging the water onto the absorption pad for evaporation of the water as the hot dry air passes through the pad.

Referring now specifically to the drawings, the numeral 10 generally designates the air cooling unit of the present invention which is illustrated as being installed on a platform 12 in the forward portion of the trunk compartment 14 of an automotive vehicle generally designated by the numeral 16. The platform 12 may be a part of the floor of the trunk compartment or may be mounted therein thus providing a horizontal supporting base plate for the air cooling unit. Also, the package shelf 18 extending horizontally rearwardly of the back of the rear seat 20 is modified to the extent that a pair of arcuate and forwardly curved cool air ducts 22 extend therethrough with the ducts 22 being illustrated as polygonal in shape but which may be of any suitable construction. These ducts 22 may be of transparent material so that the vision through the rear window 24 will not be interfered with. Also, a hot air outlet adapter or grill 26 is mounted in the package shelf 18 by suitable fasteners 28. With this construction, the cool air which is cooled by the unit 10 enters through both of the forwardly extending and curved cool air inlet ducts 22 and circulates through the passenger compartment and leaves by way of the hot air discharge grill or adapter 26 and passes downwardly through an exhaust duct 30 which extends downwardly through the platform 12 immediately forwardly of the unit 10 and extends through to the bottom of the vehicle and actually extends therebelow into the path of air as the vehicle moves forwardly. The lower end of the duct 30 is inclined as designated by numeral 32 with the longest edge being disposed forwardly so that as the vehicle moves forwardly and air passes over the duct 30 and strikes the long edge first, a partial vacuum will be induced in the duct 30 for pulling air out of the passenger compartment of the vehicle 16, due to the suction created in the duct 30 by the air passing over the tapered end 32 as the vehicle moves forwardly.

An exhaust fan 34 is provided in the duct 30 for discharging hot air when the vehicle is standing still or proceeding at a very slow rate of speed. The exhaust fan 34 is mounted on and driven from an electric motor 36 supported by suitable brackets 38 and provided with an electrical cord 40 extending through a grommet 42 in the exhaust duct 30 and provided with a suitable switch on the dashboard or any other accessible position so that the fan 34 may be operated by the operator or passengers in the vehicle as may be desired.

The air cooling unit 10 includes a generally horizontally disposed and elongated hollow casing 44 having a top 46, a bottom 48, side walls 50 and end flanges 52 which define enlarged open ends having outwardly extending funnel-shaped members 54 attached thereto by virtue of flanges 56 thereon and fastening bolts 58. The funnel-shaped members 54 are generally frusto-pyramidal in shape and have a smaller cylindrical adapter 60 at the outer end for receiving a flexible air inlet tube 62 with a clamp 64 being provided for holding the tube thereon. The flexible air tube 62 extends to and is connected with a cylindrical extension 66 on an air intake adapter 70 extending through an aperture 72 in the fender 74 of the vehicle 16. The flexible pipe 62 is secured to the cylindrical extension 66 by virtue of a clamp 76 and the forwardly facing open end of the inlet adapter 70 which is designated by the numeral 78 is held in position by a fastener 80 and may be provided with a screen for collecting and screening intake air as it proceeds into the funnel-shaped member 54. The construction of the funnel-shaped member 54 and the air intake adapter 70 is the same on both sides of the vehicle and the adapter 70 may be located in any convenient position on the exterior of the fender or on the exterior of the body adjacent the fender and rear window and is so contoured as to be generally unnoticed and otherwise compatible with the exterior appearance of the vehicle.

Mounted centrally in the casing 44 is a vertical partition wall 82 having an electric motor 84 extending therethrough and mounted therein by a mounting flange 86. The electric motor 84 is also supported by brackets 88 extending to a horizontal partition 90 parallel with the bottom 48 and extending between the lower end flanges 52 which are longer than the upper flanges thus defining a tank between the bottom 48 and horizontal partition 90 for receiving water 92.

The motor 84 has a power shaft 94 extending from each end thereof for driving the rotor 96 of a centrifugal type air fan which is of the well known squirrel cage type of fan having a central air inlet 96 in a generally cylindrical casing 98 having a tangential discharge duct 100 which extends upwardly and becomes an integral part of the cool air inlet ducts 22. The ducts 100 are supported from the top wall 46 by angle iron brackets 102 or by any other suitable means. With the construction as defined, the air which is hot and dry and taken from the outside in a fresh condition will enter through both of the flexible tubes 62 and through both of the funnel-shaped members 54 and will be drawn into the center inlet 96 of the squirrel cage or centrifugal type fans and thus will be discharged radially upwardly through the air inlet ducts 22 into the passenger compartment.

Supported inwardly of the peripheral end flange 52 is a similar flange 104 with the inner edges of the flanges 52 and 104 being interconnected by a transverse flange 106 which is spaced inwardly of the edges of the flanges 52 and 104 respectively thus providing a socket for an evaporative pad of absorbent material 108 which may be of any suitable construction and is provided with external layers of screen material 110. The flanges 106 at the top and bottom of the casing 44 are provided with apertures 112 for permitting passage of water therethrough. Also, the partition 90 exteriorly of the flange 104 is provided with apertures 114 for permitting drainage of water back to the tank in the event an excess of water is discharged downwardly through the evaporative pad 108. Thus, as the water passes through the evaporative pad 108 of absorbent material, the water will cool the air and due to the evaporation of the water, the air will be further cooled and humidified so that cool air of a proper relative humidity will be discharged into the interior of passenger compartment of the vehicle.

Disposed between the top 46 and the upper transverse flanges 106 are pipes 116 having a series of longitudinally spaced apertures 118 therein. The pipes 116 discharge water through the apertures 112 in the upper flange 106 onto the top edges of the evaporative pads 108.

The ends of the pipes 116 are interconnected by a longitudinally extending pipe 120 along the top wall of the casing 44 with the longitudinal pipe in turn being connected by virtue of a T-coupling 122 to a vertical pipe 124 connected with the discharge of a water pump 126 powered by an electric motor 128. The pump and motor assembly extends through the lower partition 90 thus isolating the electric motor 128 as well as the electric motor 84 from the water 92. The electric motors 128 and 84 are driven by electrical energy from the battery of the vehicle through a suitable switch mechanism and suitable electrical conductors.

The rear side wall 50 is provided along the outer surface thereorof with a filler tube 130 terminating above the top of the casing and provided with a filler cap 132 for replenishing the supply of water in the tank. The lower end of the filler tube 130 curves forwardly and extends through an opening 134 in the rear wall 50 thus providing for replenishment of the supply of water 92.

The top 46 and side walls 50 are covered with an insulation material 136 for maintaining the interior of the casing cool and preventing the transfer of heat into the interior of the casing to the walls thereof.

In operation, switch devices may be provided for controlling operation of the air cooling unit including the motors 36, 84 and 128 for exhausting air from the interior of the vehicle and discharging cool air into the interior of the vehicle and circulating water respectively.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An air cooling unit for installation in an automotive vehicle having a trunk compartment with a top package shelf forming a part of the passenger compartment, said cooling unit comprising an elongated casing mounted in the trunk compartment with air intake ends facing opposite sides of the compartment, a central vertical partition in said casing dividing the casing into a pair of compartments, a pair of cool air ducts extending from the pair of compartments respectively upwardly through said shelf into the passenger compartment at opposite sides thereof, a pair of fans in said compartments at opposite sides of the partition connected to said ducts for drawing in air through said ends of the casing into said compartments and blowing the air through the cool air ducts and into the passenger compartment, a motor in said casing extending through and fitted in said partition between said fans and operatively connected thereto, means in said casing for humidifying the air drawn into said ends of the casing into said pair of compartments in response to operation of said fans, an exhaust duct depending from said shelf through the bottom of the vehicle and including an upwardly and rearwardly beveled discharge end, and a fan in said exhaust duct for evacuating the passenger compartment of air whereby to provide for circulation of air from the first named ducts through the passenger compartment.

References Cited in the file of this patent

UNITED STATES PATENTS

| | | |
|---|---|---|
| 2,769,620 | Davison | Nov. 6, 1956 |
| 2,796,014 | Montgomery | June 18, 1957 |
| 2,820,351 | Dolza | Jan. 21, 1958 |